US008190843B1

(12) United States Patent
de Forest et al.

(10) Patent No.: US 8,190,843 B1
(45) Date of Patent: May 29, 2012

(54) METHODS, SYSTEMS, AND COMPUTER PROGRAM PRODUCTS FOR DYNAMICALLY ALLOCATING MEMORY AMONG A PLURALITY OF PROCESSES

(75) Inventors: Miles Aram de Forest, Bahama, NC (US); Somnath A. Gulve, Morrisville, NC (US)

(73) Assignee: EMC Corporation, Hopkinton, MA (US)

( * ) Notice: Subject to any disclaimer, the term of this patent is extended or adjusted under 35 U.S.C. 154(b) by 655 days.

(21) Appl. No.: 11/904,360

(22) Filed: Sep. 27, 2007

(51) Int. Cl.
  *G06F 13/00* (2006.01)
  *G06F 13/28* (2006.01)
(52) U.S. Cl. ................. 711/170; 711/154; 711/E12.009
(58) Field of Classification Search .................. None
  See application file for complete search history.

(56) References Cited

U.S. PATENT DOCUMENTS

| 6,023,712 A * | 2/2000 | Spear et al. ........................... 1/1 |
| 2004/0015977 A1* | 1/2004 | Benke et al. .................. 718/105 |
| 2009/0125700 A1* | 5/2009 | Kisel ............................. 711/173 |

* cited by examiner

*Primary Examiner* — Reginald Bragdon
*Assistant Examiner* — Eric S Cardwell
(74) *Attorney, Agent, or Firm* — Jenkins, Wilson, Taylor & Hunt, P.A.

(57) ABSTRACT

Methods, systems, and computer program products for dynamically allocating memory among a plurality of processes are disclosed. According to one aspect, the subject matter described herein includes a method for dynamically allocating memory among multiple processes. The method includes at a memory broker for allocating memory in a computer system among a plurality of processes executing on the computer system and separate from the memory broker, monitoring amounts of stationary memory, discretionary memory, and unallocated memory in the computer system. The memory broker receives a request for allocating discretionary memory to one of the processes, and in response, determines, using an allocation policy, whether to allocate discretionary memory to the one process. In response to determining to allocate the discretionary memory to the one process, the memory broker allocates the discretionary memory to the one process.

21 Claims, 4 Drawing Sheets

MAX INERTIA DISCOUNT = 20 %

| PROC. | BAL. HINT | % SHARE | TARGET SHARE | INERTIA SETTING | % INERTIA ADJ. | ADJ. TARGET SHARE | DISCR. MEM. ALLOC. | EXCESS MEM. | EXCESS SHARE | RECALL SHARE |
|---|---|---|---|---|---|---|---|---|---|---|
| A | 1500 | 50% | 900 | 25% | 105% | 945 | 600 | 0 | 0 | 0 |
| B | 700 | 23% | 420 | 50% | 110% | 462 | 800 | 338 | 83% | 166 |
| C | 500 | 17% | 300 | 50% | 110% | 330 | 400 | 70 | 17% | 34 |
| D | 300 | 10% | 180 | 75% | 115% | 207 | 200 | 0 | 0 | 0 |
| TOTAL | 3000 | | | | | | 2000 | 408 | | 200 |

CURRENT TOTAL DISCR. MEMORY  2000
- TARGET TOTAL DISCR. MEMORY  1800
= MEMORY TO BE RECALLED       200

FIG. 3

METHODS, SYSTEMS, AND COMPUTER PROGRAM PRODUCTS FOR DYNAMICALLY ALLOCATING MEMORY AMONG A PLURALITY OF PROCESSES

TECHNICAL FIELD

The subject matter described herein relates to methods and systems for dynamically managing memory. More particularly, the subject matter described herein relates to methods, systems, and computer program products for dynamically allocating memory among a plurality of processes.

BACKGROUND

In response to the ever-increasing complexity of computers, systems, and networks, computer hardware and software are typically designed to be modular, with a well-defined division of labor between software and/or hardware components. A well-known example is a device driver, which is a computer program or process that acts as an intermediary between higher-level programs, such as applications, and lower-level hardware, such as disk drives, input/output (I/O) channels, communication devices, and the like. Device drivers provide a well-defined interface between a device and the applications or operating systems that use the device. There may be many different device drivers on a system, and there may be duplicated instances of a particular kind of device driver. For example, a system may have one kind of device driver to handle keyboard input, another kind of device driver to handle access to system memory, and yet another kind of device driver or drivers to manage I/O with a hard disk or disk array.

Device drivers are but one example of processes that perform functions within a computer system. Each process is in essence a computer program and usually requires some computer memory, for example, for storing temporary data, caching data streams sent to or received from peripherals, such as serial ports or storage devices, and so on. Typically, processes must request some portion of system memory to be allocated to them for their use. However, system memory is a finite, limited resource which generally must be shared. In a system with multiple processes, a process that requests a certain amount of system memory may be allocated the amount of memory requested, an amount less than the amount of memory requested, or even no memory at all.

One problem faced by processes is the question of how much memory the process should request in excess of the minimum amount of memory required for the process to function. For example, a process such as a hard-disk device driver may improve overall system performance if it can keep a number of often-used disk sectors in local random access memory (RAM), because accessing RAM may be orders of magnitude faster than accessing data stored on a hard drive. The more disk sectors that can be cached to RAM, the better the system performance will be due to the decreased data access time. However, because the limited amount of RAM must also be shared among other processes, a hard-disk device driver should not be allocated all available RAM, else other processes cannot operate.

Therefore, system designers face a dilemma: if a process requests and is allocated the maximum amount of the memory that it may ever need, but the process never actually uses all of the memory that it has reserved for itself, that unused memory is wasted, since the memory cannot be used by any other process unless the memory is released by the process to which it has been reserved. Furthermore, if many processes request and are allocated memory that they never use, the total system performance may be impaired, perhaps fatally. On the other hand, if a process requests and is allocated only the minimum amount of memory that it requires at the moment, but later finds that it needs more, its later request may be denied, if all of the remaining system memory has been taken by other processes. When this happens, the process may fail or operate at a reduced level of function or performance. For this reason, a process will typically request an amount of memory sufficient for all situations that the process may reasonably be expected to handle. As a result, memory tends to be wasted, and the cumulative amount of the memory wasted by all processes can be significant.

Adding to the problem is the fact that many processes, especially device drivers dealing with data or communications streams, may require a relatively large amount of memory only for temporary periods, and otherwise require a relatively small amount of memory. In conventional memory management systems that make no distinction between memory that a process requires for its operation and excess memory allocated to a process to enhance its performance, such processes may request the relatively large amount of memory despite the fact that large portions of the allocated memory may be unused for significant amounts of time.

One commonly used method to manage limited memory resources is the use of a "garbage collector", which reclaims memory that will never be accessed or used again by a process. However, even in systems that implement garbage collection, memory may be reclaimed only if the process has finished using it. The term "garbage" collection reflects the fact that the memory reclaimed has been implicitly or explicitly discarded by the process.

Another attempted solution to the problems described above involves placing extra intelligence into the processes themselves, such as adding the ability for a process to monitor not only the memory that has been allocated to it, but also the memory that has not been allocated to any process, or unallocated memory, as well. Such a process may then request additional allocations when memory becomes available or relinquish memory when unallocated memory becomes scarce.

However, there are some inherent disadvantages to this approach. First, each process must include the ability to monitor unallocated memory, adding to the complexity and size each process and requiring an relatively expensive and difficult modification to the system software as a whole. Second, unless all processes have this additional ability, an unmodified (legacy) process may dominate the memory use or be dominated by the other processes. Third, even if all processes are upgraded, the competitive nature of this approach means that unless these processes cooperate, this may result in the very problem that the additional complexity was intended to solve—a lack of sufficient memory to satisfy stationary memory requirements due to one or more processes selfishly grabbing all available memory. In short, with multiple processes vying to use unallocated memory, a regulatory mechanism is required to balance the demand and claims of the various processes.

Accordingly, in light of the disadvantages described above, there exists a need to dynamically allocate discretionary memory among multiple processes.

SUMMARY

The subject matter described herein includes methods, systems, and computer program products for dynamically allocating memory among a plurality of processes. In one implementation, memory of a computer system is classified as stationary memory, discretionary memory, and unallocated memory.

As used herein, the term "discretionary memory" refers to memory that a process uses to enhance performance or behavior. Another characteristic of discretionary memory is that it is memory that a process is prepared to do without and/or is prepared to release when asked. As used herein, the term "stationary memory" refers to memory that is required by a process for its operation and is not subject to reclamation unless released by the process.

According to one aspect, the subject matter described herein includes a method for dynamically allocating memory among multiple processes. The method includes at a memory broker for allocating memory in a computer system among a plurality of processes executing on the computer system and separate from the memory broker, monitoring amounts of stationary memory, discretionary memory, and unallocated memory in the computer system. The memory broker receives a request to allocate discretionary memory to one of the processes, and in response, determines, using an allocation policy, whether or not to allocate discretionary memory to the process. In response to determining to allocate the discretionary memory to the one process, the memory broker allocates the discretionary memory to the one process.

According to another aspect, the subject matter described herein includes a system for dynamically allocating memory among a plurality of processes. The system includes a computer memory, where the computer memory includes stationary memory, discretionary memory, and unallocated memory. The system also includes a memory broker function for allocating the memory among multiple processes executing on the computer system and separate from the memory broker. The memory broker monitors amounts of stationary memory, discretionary memory, and unallocated memory in the computer system. The memory broker receives a request for allocating discretionary memory to one of the processes, and in response, determines, using an allocation policy, whether to allocate discretionary memory to the one process. In response to determining to allocate the discretionary memory to the one process, the memory broker allocates the discretionary memory to the one process.

The subject matter described herein for dynamically allocating memory among multiple processes may be implemented in hardware in combination with software, and/or firmware. As such, the terms "function" or "module" as used herein refer to hardware in combination with software, and/or firmware for implementing the feature being described. In one exemplary implementation, the subject matter described herein may be implemented using a computer program product comprising computer executable instructions embodied in a non-transitory computer readable medium. Exemplary non-transitory computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

In accordance with the subject matter disclosed herein, systems, methods, and computer program products are provided for dynamically allocating memory among multiple processes. A distinction is made between stationary memory and discretionary memory, allowing greater flexibility with regards to memory allocation requests from a process. Furthermore, a mechanism is provided by which a system may request reclamation of discretionary memory from a process. Allocation and reclamation may be based on policies, such as apportionment of the allocation and/or reclamation across multiple processes according to various principles such as fairness, target excesses, inertia, and others.

Figure 1A:
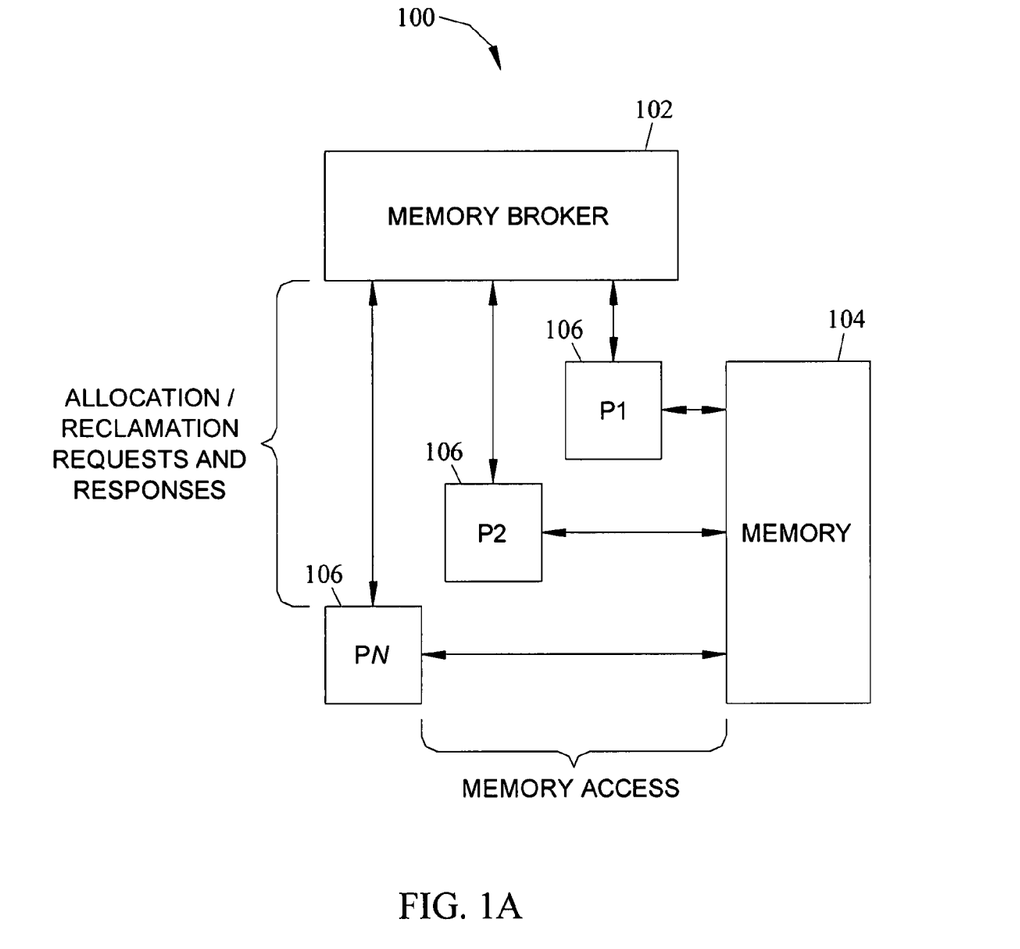
FIG. 1A is a block diagram illustrating an exemplary system for dynamically allocating memory among multiple processes in accordance with an embodiment of the subject matter described herein.

FIG. 1A is a block diagram illustrating an exemplary system for dynamically allocating memory among multiple processes in accordance with an embodiment of the subject matter described herein. Referring to FIG. 1A, system 100 may include a memory broker function 102 for dynamically allocating portions of a memory 104 among multiple processes 106. Memory broker function 102 may be separate from processes 106. In one embodiment, processes 106 include processes P1 through PN. Each of the processes 106 may issue an allocation request to memory broker function 102 for allocation of stationary memory, discretionary memory, or both. Processes 106 may access that portion of memory 104 allocated to them by memory broker function 102. In one embodiment, memory broker function 102 may be a component of a memory management unit (MMU), memory management subsystem, or similar. In one embodiment, processes may perform memory accesses through memory broker function 102.

Figure 1B:
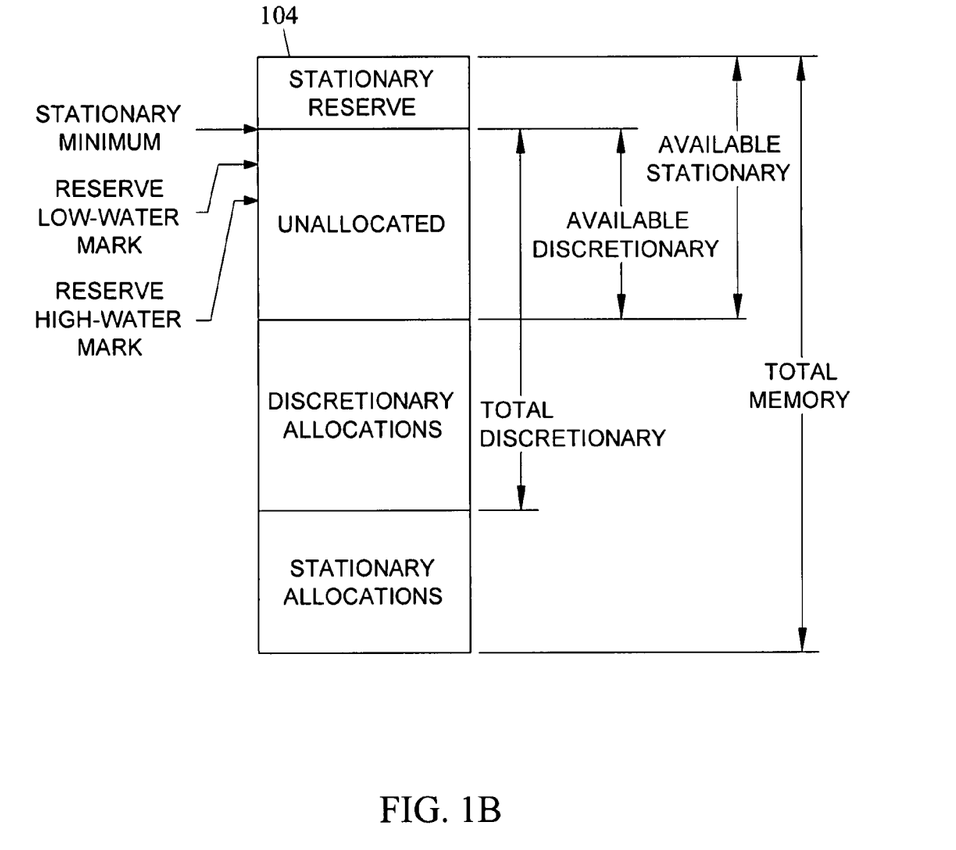
FIG. 1B is a block diagram showing an exemplary allocation of memory in accordance with an embodiment of the subject matter described herein.

FIG. 1B is a block diagram showing an exemplary allocation of memory in accordance with an embodiment of the subject matter described herein. Referring to FIG. 1B, it can be seen that memory 104 may be conceptually divided into four distinct portions. One portion of memory 104 is the stationary reserve. The stationary reserve is an unallocated portion of memory 104 reserved for use only to fulfill requests for allocation of stationary memory. Another portion of memory 104 is the unallocated portion of memory 104 that is not the stationary reserve. In one embodiment, a request for stationary memory may be filled from all available unallocated memory, i.e., from the combined unallocated and stationary reserve portions, while requests for discretionary memory may be filled only from the unallocated portion of memory 104. Thus, in this embodiment, the unallocated portion may also be referred to as "available discretionary memory." A third portion of memory 104 is the portion containing discretionary allocations, i.e., memory that has been allocated to processes and that is subject to reclamation. A fourth portion of memory 104 is the portion containing stationary allocations, i.e., memory that has been allocated to processes and that is not subject to reclamation.

Conceptually, the stationary reserve is a portion of unallocated memory that is protected from discretionary allocation so that the system has a pool of memory from which to immediately fulfill any request for stationary memory. Since stationary memory typically is memory that a process must have to operate correctly, it is important that memory broker function 102 keep enough memory available to satisfy these requests. Once that immediate need for stationary memory has been met, memory broker function 102 may then take steps to free up or reclaim enough discretionary memory, whether allocated or unallocated, to replenish the stationary reserve.

In one embodiment, a stationary minimum may define the minimum amount of stationary reserve that system 100 should maintain. Should the total amount of unallocated memory including the stationary reserve drop below a reserve low-water mark, memory broker function 102 may be triggered to begin the reclamation process. In one embodiment, the reclamation process may stop when the amount of unallocated memory increases to a value above the low-water mark. In an alternative embodiment, the reclamation process may continue until the amount of unallocated memory increases to a value above a reserve high-water mark. The use of a high-water mark avoids excessive reclamation of memory, which tends to be computationally expensive and may reduce overall system performance.

In one embodiment, should the total amount of unallocated memory including the stationary reserve increase above the reserve high-water mark, such as through voluntary release of discretionary memory by one or more processes, memory broker function 102 may be triggered to begin allocating discretionary memory to processes that have made requests to have additional memory allocated to them if it becomes available. As a special case when there is only one process using discretionary memory, memory broker function 102 could choose not to reclaim memory when the available space reaches the low watermark. Reclamation would still be required, however, if the stationary reserve fell below its minimum. In an alternative embodiment, memory broker function 102 may be triggered to notify processes that additional memory is available so that they can re-request their previously denied requests for discretionary allocations.

In one embodiment, allocating stationary memory is given highest priority, maintaining the stationary reserve is given the next highest priority, and allocating discretionary memory is given lowest priority. In this embodiment, memory broker function 102 may guarantee a sufficient amount of stationary reserve memory by adjusting the amount of total discretionary memory, where total discretionary memory is defined as the total of both allocated and unallocated discretionary memory.

For example, memory broker function 102 may set a variable called "target total discretionary memory" representing the portion of memory 104 that may be used for discretionary memory allocations. The target amount of total discretionary memory is essentially a limit imposed on the amount of discretionary memory allowed in memory 104, in order to guarantee that a sufficient amount of stationary reserve is maintained. This limit may vary continuously throughout the operation of system 100, as the size of stationary and discretionary allocations fluctuate. For example, in a system where memory 104 is 10 gigabytes, stationary reserve is set to 2 gigabytes, stationary allocations account for 3 gigabytes, and discretionary allocations fill the remaining 5 gigabytes, if memory broker function 102 receives a request for an additional 1 gigabyte of stationary allocation, that memory will be allocated from the stationary reserve. As a result, the new allocation is added to or included in the stationary allocations portion of memory 104, causing the stationary reserve to drop below its 2 gigabyte minimum. In that case, memory broker function 102 will attempt to replenish the stationary reserve back to its preferred amount of 2 gigabytes by setting the target total discretionary memory value to 4 gigabytes. The value of target total discretionary memory may be used to calculate how much, if any, discretionary memory should be reclaimed from each process.

One advantage of using memory broker function 102 is that this function may be added to an existing memory management subsystem with little or no modification to the existing memory management subsystem. In one embodiment, the functions of an existing memory management subsystem may be supplemented, rather than replaced, by memory broker function 102. For example, where the existing memory management subsystem treats all memory allocation requests as requests for memory that will not be subject to later reclamation, the existing memory allocation functions may be trivially modified and remapped into requests involving stationary memory. In this scenario, allocation and reclamation of discretionary memory would be handled by memory broker function 102. By remapping legacy memory allocation functions into stationary memory allocation functions, processes that do not need to take advantage of discretionary memory need not be changed, while processes that want to take advantage of discretionary memory may use additional function calls provided by memory broker function 102.

In one embodiment, processes that want to use discretionary memory may first need to establish a relationship with memory broker function 102 by calling a configuration function. For example, a configuration function may be used to establish the basic operating parameters for the interaction between the process and memory broker function 102. In an alternative embodiment, a process may pass operating parameters as arguments to the memory allocation functions. Example operating parameters may include reclamation and/or availability callbacks and cookies, balance hints, and process inertia values. These parameters will now be discussed in turn.

A reclamation callback is a mechanism by which memory broker function 102 may request a process to release discretionary memory. For example, a reclamation callback may be a public function of a process, an interrupt vector, an interprocess communication message, or other means by which one entity, such as memory broker function 102, may request an action from another entity, such as a process. In one embodiment, information provided to the process via the reclamation callback may include the amount of available discretionary space, the amount of discretionary memory currently in use by the process, the memory broker's idea of the ideal amount of discretionary memory that the process should have, and the reclamation cookie. In this embodiment, the difference between the suggested amount of discretionary memory and the amount of discretionary memory currently in use may indicate the amount memory broker function 102 is asking the process to free. Alternatively, the memory broker could indicate to the process the amount of discretionary memory that the process should release, rather than the amount of discretionary memory that the process should retain.

An availability callback is a mechanism by which a process may request notification if discretionary memory becomes available. In one embodiment, a process may register for notification via a function call which allows a process to register for notification if the available discretionary memory rises above a specified value. For example, to request notification, the process may specify a callback function, a callback cookie, and a quantity of memory. In one embodiment, notification behaves as a one-shot, in which case the process's callback is only called once, and the process must re-register if it wishes to receive subsequent notices of additional available memory. In this embodiment, a repeated request for notification may override the previous request. In an alternative embodiment, notification may remain in effect until explicitly terminated, prior to which the process's availability callback may be called multiple times.

Notification callbacks may merely indicate that the memory is available at the instant the callback is invoked and may not be a guarantee that the process will be able to allocate that amount of memory. Alternately, a process may use a function to retrieve the same information that would be supplied by the callback.

A cookie is an opaque (to memory broker function 102) token that may be presented to memory broker function 102 by the process, such as during process registration or as part of an allocation request from process, and passed back to the process as an argument to the reclamation/availability callback function. In one embodiment, a reclamation cookie may be used by the process to identify the context of the allocation request, so that if and when the process receives a reclamation request from memory broker function 102, the process may intelligently release a portion of its currently allocated discretionary memory. For example, the cookie may be a pointer to a data structure or some other means by which a particular process, data structure, or portion of memory may be identified.

A balance hint is a value that a process may include in its allocation request or otherwise send to memory broker function 102 for the purpose of suggesting an amount of discretionary memory to be allocated to the process. The value may represent the process's best estimate of what would be a satisfactory, rather than maximum, amount of discretionary memory. The collection of balance hints provided by the processes are used by memory broker function 102 to determine how best to balance the distribution of discretionary memory. Memory broker function 102 may also use the balance hints to determine whether and from whom to request reclamation.

A process inertia value is used to indicate to memory broker function 102 how resistant the process is to changing their memory usage. In one embodiment, processes are associated with inertia values between 1 and 100, default 50; a higher number may indicate a larger resistance to change. Memory broker function 102 function may consider the process's inertia value during memory rebalancing to favor reclaiming memory from processes that can most easily release it—i.e., processes with lower inertia values.

After establishing a relationship with memory broker function 102, a process may update the operating parameters. In one embodiment, a process may update its operating parameters used by memory broker function 102 via functions that set the reclamation callback function and/or token, set and/or get the process's balance hint, and set and/or get a process's inertia value.

In one embodiment, a process may allocate and free discretionary memory through the use of functions, such as those provided by memory broker function 102. For example, a process may use a function to request allocation of discretionary memory. In one embodiment, if the requested amount of discretionary memory is available it is immediately returned to the caller; otherwise no memory is returned. Similarly, a process may use a function to return discretionary memory to memory broker function 102.

In one embodiment, memory broker function 102 may request a process to return some of its discretionary memory by calling the process's reclamation callback. The callback serves merely to notify the process that the memory broker function 102 desires memory; a process actually returns memory when it is convenient for it to do so. In this embodiment, processes are expected to be good citizens and return memory in a timely manner, but there is neither a hard requirement to do so nor any enforcement mechanism. In alternative embodiments, the reclamation request may be mandatory, in which a process is required to return the amount of memory requested, or the request must be responded to within a specified time limit, for example.

In one embodiment, memory broker function 102 need not wait for the response from a first reclamation callback before issuing a subsequent reclamation callback, in which case it is possible that memory broker function 102 will invoke a process's reclamation callback again before the memory requested by the first callback has been deallocated. In this case the process may interpret the second callback as a new target.

Figure 2:
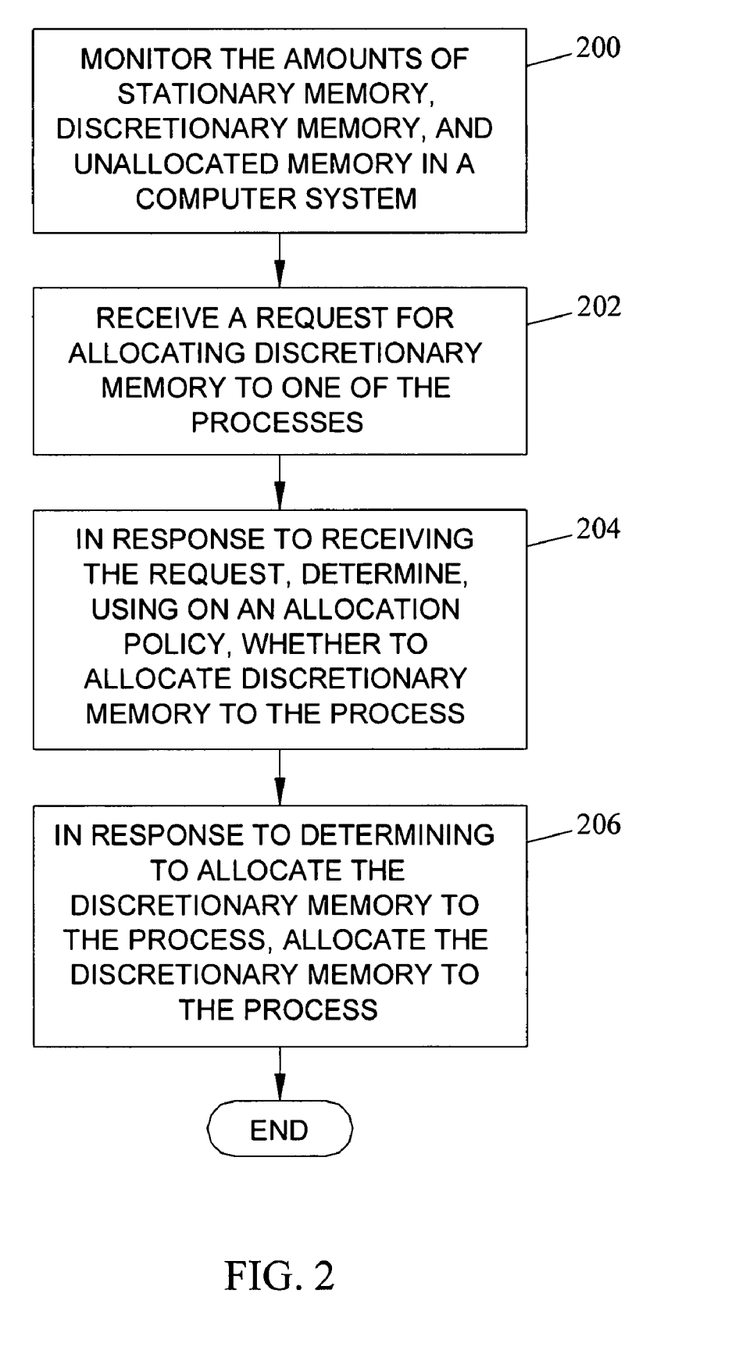
FIG. 2 is a flow chart illustrating an exemplary method for dynamically allocating memory among multiple processes in accordance with an embodiment of the subject matter described herein.

FIG. 2 is a flow chart illustrating an exemplary method for dynamically allocating memory among multiple processes in accordance with an embodiment of the subject matter described herein. This flow chart is explained in reference to the components illustrated in FIG. 1A.

In one embodiment, memory broker function 102 allocates memory 104 among multiple processes 106 executing on system 100. Memory broker function 102 is a process separate from processes 106. Portions of memory 104 may be allocated as stationary memory, allocated as discretionary memory, or may be unallocated. In one embodiment, stationary memory is allocated memory that is subject to reclamation by the memory broker function if it has been discarded by the process to which the memory is allocated, and discretionary memory is allocated memory that is subject to reclamation by the memory broker function even if it has not been discarded by the process to which the memory is allocated.

At block 200, the amounts of stationary memory, discretionary memory, and unallocated memory in the computer system are monitored. In one embodiment, memory broker function 102 may monitor the contents of memory 104 and maintain information about each process's memory use. For example, memory broker function 102 may track how much stationary memory is being used by each process, how much discretionary memory has been requested for each process, how much discretionary memory has been allocated to each process, and how much of memory 104 remains in an unallocated state. memory broker function 102 may maintain other information about each process as well, such as each process's balance hint, inertia value, or other parameter associated with the process. This is discussed in greater detail with respect to FIG. 3, below.

At block 202, a request is received for allocating discretionary memory to one of the processes. For example, process P2, one of processes 106, may issue an allocation request to memory broker function 102.

At block 204, in response to receiving the request, an allocation policy is used to determine whether to allocate discretionary memory to the process. Exemplary allocation policies are also described in greater detail with respect to FIG. 3.

At block 206, in response to determining to allocate the discretionary memory to the one process, the discretionary memory is allocated to the process. In one embodiment, memory broker function 102 may reserve a portion of memory 104 for use by process P2, and respond to process P2's allocation request by returning a pointer to the reserved portion of memory 104.

In one embodiment, process P2 may then directly access memory 104 without involving memory broker function 102. In alternative embodiments, memory broker function 102 may act as the gatekeeper between processes 106 and memory 104, such processes 106 may access memory 104 only through memory broker function 102. For example, processes 106 may be required to access memory 104 via memory access functions provided by memory broker function 102.

The subject matter described herein may be applied to a variety of processes with a variety of memory allocation needs. In one embodiment, a process may maintain a data structure, block of memory, or other construct that is too large to fit into available memory and must be demand-paged. When a portion of the construct is needed, if the page containing that portion is not already in memory then the I/O operation that is referencing the portion incurs additional latency and performance of the LU suffers.

These types of processes are well suited to dynamically adjusting their memory consumption, a characteristic referred to as having "low inertia." If memory consumption needs to be reduced then instead of holding onto a page or other portion of the construct when the process is done with it, the process may de-allocate the memory and later reread the data if needed. If memory resources are plentiful then these processes may take advantage of the available resources by allocating additional memory to hold another page of data instead of reusing memory already allocated.

A process could, for example, determine what would be a reasonable and balanced portion of the data to keep in memory based on a variety of heuristics, such as how recently particular pages or portions of the data were used, the number of entries in a least recently used pages list that are younger than a certain age, and others.

In another embodiment, a process may need to maintain data in a structure that, for performance reasons, must be kept entirely in memory. Such data structures may not be well suited for being dynamically adjusted (a characteristic referred to as having "high inertia").

Processes with high inertia tend to be given preference over processes with low inertia during distribution of discretionary memory, since high-inertia processes tend to tolerate memory scarcity less well than low-inertia processes. Returning to the examples above, a process which must keep its data structure entirely in memory may be designed to use an smaller, fallback structure rather than fail entirely, if memory is scarce. In such cases, the process may lose performance or functionality because the fallback structure's reduced size came at the expense of reduced data content, quality, or resolution. In contrast, a process with low inertia may tolerate a reduction in the amount of discretionary memory allocated to it. Referring again to the example above, a process which is already incurring overhead to page data in and out of memory may suffer only a slight decrease in performance if the number of pages stored in discretionary memory is reduced from 50 to 49, for example.

In one embodiment, a simple heuristic to determine a reasonable and balanced amount of memory could be based on the amount of memory required, for example, to achieve a moderate level of detail, quality, or resolution.

As mentioned above, memory broker function 102 may use one or more policies to determine when, from whom, and how much discretionary memory to allocate or reclaim from processes 106.

Figure 3:
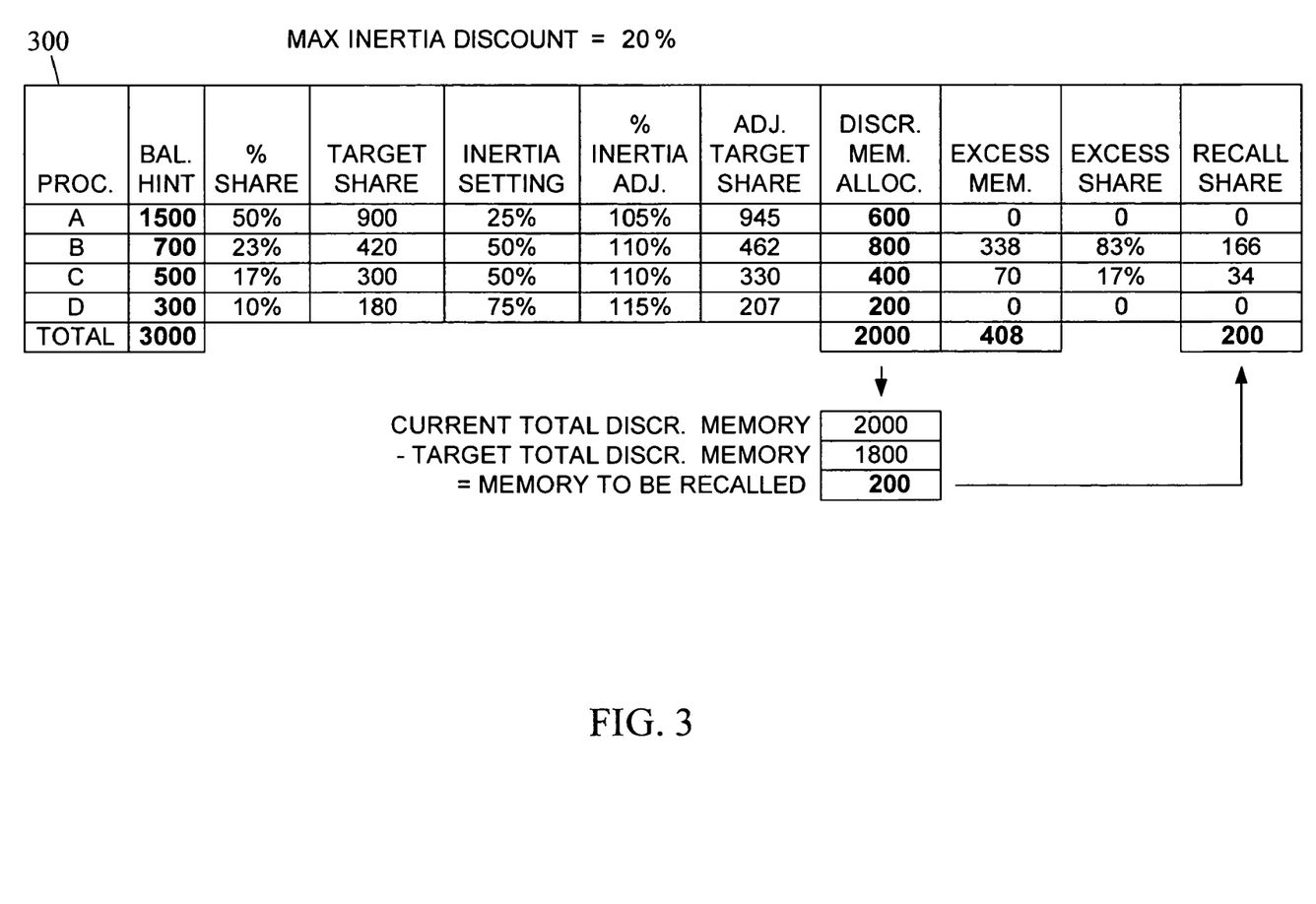
FIG. 3 is a table illustrating exemplary calculations used by an exemplary allocation and reclamation policy in accordance with an embodiment of the subject matter described herein.

FIG. 3 is a table illustrating exemplary calculations used by an exemplary allocation and reclamation policy based on fairness that incorporates balance hints and process inertia values in accordance with an embodiment of the subject matter described herein. Referring to FIG. 3, each row in table 300 corresponds to information maintained for one of multiple processes 106. The columns in table 300 will now be described in order, from left to right.

The "process" column identifies the process for which information is maintained. In FIG. 3, four processes are listed, identified by the names A, B, C, and D.

The "balance hint" column contains the value of the balance hint received by the process. In one embodiment, the balance hint may be provided during configuration, such as when a process registers with memory broker 102. In alternative embodiments, the balance hint may be included in the allocation request sent by the process to memory broker function 102, or via another mechanism, such as a function call for that purpose.

In one embodiment, the balance hint is the suggested amount of memory (in kilobytes, for example) that the process requests from memory broker function 102. The balance hint may be provided to memory broker 102 so that it may compare and normalize allocation of discretionary memory across multiple processes. In FIG. 3, process A requested 1500 kilobytes of discretionary memory, while processes B, C, and D requested 700 kilobytes, 500 kilobytes, and 300 kilobytes of discretionary memory, respectively. The total discretionary memory requested by all processes equals 3000 kilobytes.

The "% share" column contains a number representing the portion of discretionary memory suggested by each process relative to the total of all discretionary memory requested by all processes. In one embodiment, the number may be used to calculate a target relative share of available memory that each process should get when process becomes available, and also the relative share of allocated memory to be relinquished should memory become scarce. In one embodiment, the value of % share may be calculated by the equation:

$$\% \text{ share} = \text{process balance hint}/\text{total balance hints}$$

In FIG. 3, process A requested 1500 kilobytes out of a total 3000 kilobytes requested by all processes. Process A requested 1500/3000, or 50% of the discretionary memory requested, which gives process A a 50% share. Processes B, C, and D, respectively, have % shares of 23% (700/3000), 17% (500/3000), and 10% (300/3000).

In FIG. 3, the target total discretionary memory has been set to a value of 1800 kilobytes, representing the limit to be imposed on total discretionary memory in order to make available enough unallocated memory to meet the stationary reserve's high-water mark. This is the value that will be used for the remainder of the explanation, below.

The "target share" column shows the amount of discretionary memory that each process would be allocated under the new target total discretionary memory. In one embodiment, the target share value may be calculated by the equation:

$$\text{target share} = \text{target total discretionary memory} \times \% \text{ share}$$

In FIG. 3, the target share for process A is 50% of the target total discretionary memory, which is 50% of 1800, or 900 kilobytes. Processes B, C, and D, respectively, have target shares of 420 (23% of 1800), 300 (17% of 1800), and 180 (10% of 1800) kilobytes. In one embodiment, a process's target share is the amount of discretionary memory the process may currently keep without reclamation. In other words, if a process has an amount of discretionary memory allocated to it greater than the current target share for that process, the process may be asked to relinquish that amount of memory in excess of the current target share.

The "inertia setting" column lists the inertia setting value that each process has set for itself. As stated above, the inertia value is a relative indication of how difficult it is for a process to give up memory. The process's inertia value is used to determine how much memory may be allocated to the process in excess of the target share before the process is asked to relinquish memory. In one embodiment, the inertia value is used to increase or extend the current target share for the process. Doing so will protect the process somewhat from being affected by relatively minor reductions in the target total discretionary memory. Put another way, the process will be allowed to keep some percentage more than its target share. In one embodiment, a maximum inertia discount may be used to limit the amount by which the target share may be adjusted, and a process's inertia setting is a value between 1 and 100, indicating what percentage of the maximum inertia discount should be applied to the process. A high inertia setting indicates a higher resistance to change of memory allocation. In FIG. 3, the maximum inertia discount is 20%.

The "% inertia adjustment" column lists the amount by which each process's target share will be increased, based on the process's inertia setting. In one embodiment, the value of % inertia adjustment may be calculated by the equation:

% inertia adjustment=1+inertia setting×maximum inertia discount

In FIG. 3, the maximum inertia discount has been set to 20%. Since process A's inertia setting is 25%, process A may have 25% of the maximum inertia discount of 20%, or 5%. Since the inertia setting increases the target share, the value of process A's % inertia adjustment will be 100%+5%, or 105%. Processes B and C have % inertia adjustments of 110% (1+50% of 20%), and process D has a % inertia adjustment of 115% (1+75% of 20%).

The "adjusted target share" column contains the target share for each process after adjustment for inertia. In one embodiment, the value of adjusted target share may be calculated by the equation:

adjusted target share=target share×% inertia adjustment

In FIG. 3, process A's target share of 900 kilobytes is increased by 5%, resulting in an adjusted target share of 945 (900×105%). Processes B, C, and D, respectively, have adjusted target shares of 462 (420×110%), 330 (300×110%), and 207 (180×115%).

The "discretionary memory allocated" column shows the amount of discretionary memory currently allocated to each process. In FIG. 3, the amounts of discretionary memory allocated to processes A through D, respectively, are 600, 800, 400, and 200 kilobytes. The discretionary memory actually allocated for all processes totals 2000 kilobytes. In one embodiment, the difference between the total discretionary memory allocated and the target total discretionary memory equals the amount of discretionary memory to be reclaimed by memory broker function 102. In FIG. 3, 200 kilobytes of discretionary memory must be recalled in order to reduce the discretionary memory allocation from it current actual allocation (2000 kilobytes) to its target total discretionary memory (1800 kilobytes).

The "excess memory" column shows the amount of actual memory allocated that is in excess of the adjusted target share. In one embodiment, the value for excess memory may be calculated by the equation:

excess memory=max ((actual memory allocated−adjusted target share),0)

In FIG. 3, process A has been actually allocated 600 kilobytes of memory. Since that amount is not in excess of its adjusted target share of 946 kilobytes, process A has 0 excess memory. Process B has been allocated 800 kilobytes of memory, which is 338 kilobytes in excess of its adjusted target share of 462 kilobytes. Similarly, process C has been allocated 400 kilobytes of memory, or 70 kilobytes in excess of its adjusted target share of 300 kilobytes. Since process D's actual memory allocation of 200 kilobytes is not in excess of its adjusted target share of 207 kilobytes, process D, like process A, has no excess memory. In FIG. 3, the total excess memory across all processes is 338 kilobytes+70 kilobytes, or 408 kilobytes.

The "% excess share" column contains a number representing the portion of excess memory attributed to each process relative to the total of all excess memory attributed by all processes. In one embodiment, the value of excess share may be calculated by the equation:

% excess share=process excess memory/total excess memory

In FIG. 3, processes A and D have a 0% excess share, because they have no excess memory. Processes B and C have excess shares of 83% (338/408) and 17% (70/408), respectively.

The "recall share" column indicates the amount of discretionary memory that memory broker function 102 will request to be reclaimed from each process. In one embodiment, the value of recall share may be calculated by the equation:

recall share=% excess share×memory to be recalled

In FIG. 3, processes A and D have a 0% recall share, and thus will not be asked to relinquish any discretionary memory. Processes B and D will be asked to relinquish 166 kilobytes (83% of 200 kilobytes) and 34 kilobytes (17% of 200 kilobytes), respectively.

In one embodiment, memory broker functions may be reentrant, which allows them to be called in the context of callbacks from memory broker function 102.

In one embodiment, a process may respond to a reclamation request according to the process's own timetable. In this embodiment, however, processes should generally respond to reclamation requests within a few seconds at most.

In one embodiment, all processes 106 must register with memory broker function 102. During process entry, i.e., before all processes have registered and had an opportunity to request discretionary memory, it is desirable not create an imbalanced situation that will require immediate and repeated rebalancing. For this reason, after a system reboot, memory broker function 102 may limit its discretionary allocations during process entry to a level compatible with the allocations that existed before the reboot. For example, for some processes, such as the cloning process described above, this level can be derived by from their current configuration. For other processes, such as the mapping process described above, their discretionary needs are largely driven by workload and thus can be largely deferred until IO begins.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for dynamically allocating memory among a plurality of processes, the method comprising:
   at a memory broker function for allocating memory in a computer system among a plurality of processes executing on the computer system and separate from the memory broker function, wherein the memory in the computer system includes stationary memory, discretionary memory, and unallocated memory:
      monitoring amounts of stationary memory, discretionary memory, and unallocated memory in the computer system;
      receiving a request for allocating discretionary memory to one of the processes;
      in response to the request, determining, using an allocation policy, whether to allocate discretionary memory to the one process;
      in response to determining to allocate the discretionary memory to the one process, allocating the discretionary memory to the one process;
      determining, based on a reclamation policy, that at least a portion of discretionary memory allocated to at least one of the processes should be reclaimed; and
      in response to determining that at least a portion of discretionary memory should be reclaimed, requesting reclamation of at least a portion of discretionary memory from at least one of the plurality of processes,
   wherein the stationary memory is allocated memory of the memory in the computer system that is required by a process and that is not subject to reclamation by the memory broker function unless the allocated memory has been discarded by the process to which the memory is allocated and wherein the discretionary memory is allocated memory of the memory in the computer system that is subject to reclamation by the memory broker function even if the allocated memory has not been discarded by the process to which the memory is allocated, and wherein the reclamation policy considers process inertia values that indicate how resistant a process is to changing its memory usage.

2. The method of claim 1 wherein the processes include drivers associated with input/output operations to a disk storage array.

3. The method of claim 1 wherein the allocation policy is based on at least one of an amount of stationary and discretionary memory requested by each process, an amount of stationary and discretionary memory allocated to each process, an amount of stationary and discretionary memory allocated to each process in excess of an amount of stationary and discretionary memory requested by each process, and an amount of unallocated memory in the computer system.

4. The method of claim 1 wherein determining that at least a portion of discretionary memory allocated to at least one of the processes should be reclaimed comprises:
   determining that an amount of unallocated memory in the computer system has fallen below a threshold amount; and
   in response to determining that an amount of unallocated memory has fallen below the threshold amount, determining an amount of discretionary memory allocated to at least one of the processes that should be reclaimed to replenish the unallocated memory in the computer system to at least the threshold amount.

5. The method of claim 1 where the reclamation policy is based on at least one of an amount of stationary and discretionary memory requested by each process, an amount of stationary and discretionary memory allocated to each process, an amount of stationary and discretionary memory allocated to each process in excess of an amount of stationary and discretionary memory requested by each process, an inertia value associated with each process, and an amount of unallocated memory in the computer system.

6. The method of claim 1 wherein requesting reclamation includes:
   sending, to a process to which discretionary memory has been allocated, a reclamation request; and
   in response to receiving the reclamation request, releasing, by the process, at least a portion of the discretionary memory that has been allocated to the process.

7. The method of claim 6 wherein sending a reclamation request comprises invoking a reclamation callback function in the process from which reclamation is being requested.

8. The method of claim 1 comprising:
   at the memory broker function:
      receiving, from one of the plurality of processes, a request for notification of the availability of a specified amount of discretionary memory; and
      in response to receiving the notification request, registering the one process to receive notification of the availability of the specified amount of discretionary memory.

9. The method of claim 8 comprising:
   at the memory broker function:
      determining that the specified amount of discretionary memory is available; and
      in response to determining that the specified amount of discretionary memory is available, notifying the one process of the availability of the specified amount of discretionary memory.

10. The method of claim 9 wherein notifying the one process of the availability of the specified amount of discretionary memory comprises invoking an availability callback function in the one process.

11. A system for dynamically allocating memory among a plurality of processes, the system comprising:
    a computer memory, wherein the computer memory includes stationary memory, discretionary memory, and unallocated memory; and
    a memory broker function for allocating the computer memory among a plurality of processes executing on a computer system and separate from the memory broker, wherein the memory broker function is adapted to:
       monitor amounts of stationary memory, discretionary memory, and unallocated memory in the computer system;
       receive a request for allocating discretionary memory to one of the processes;
       in response to the request, determine, using an allocation policy, whether to allocate discretionary memory to the one process;
       in response to determining to allocate the discretionary memory to the one process, allocate the discretionary memory to the one process;
       determine, based on a reclamation policy, that at least a portion of discretionary memory allocated to at least one of the processes should be reclaimed; and
       in response to determining that at least a portion of discretionary memory should be reclaimed, request reclamation of at least a portion of discretionary memory from at least one of the plurality of processes,
    wherein the stationary memory is allocated memory of the memory in the computer system that is required by a process and that is not subject to reclamation by the memory broker function unless the allocated memory has been discarded by the process to which the memory is allocated and wherein the discretionary memory is allocated memory of the memory in the computer system that is subject to reclamation by the memory broker even if the allocated memory has not been discarded by the process to which the memory is allocated, and wherein the reclamation policy considers process inertia values that indicate how resistant a process is to changing its memory usage.

12. The system of claim 11 wherein the processes include drivers associated with input/output operations to a disk storage array.

13. The system of claim 11 wherein the allocation policy is based on at least one of an amount of stationary and discretionary memory requested by each process, an amount of stationary and discretionary memory allocated to each process, an amount of stationary and discretionary memory allocated to each process in excess of the amount of stationary and discretionary memory requested by each process, and an amount of unallocated memory in the computer system.

14. The system of claim 11 wherein determining that at least a portion of discretionary memory allocated to at least one of the processes should be reclaimed comprises:
  determining that an amount of unallocated memory in the computer system has fallen below a threshold amount; and
  in response to determining that an amount of unallocated memory has fallen below the threshold amount, determining an amount of discretionary memory allocated to at least one of the processes that should be reclaimed to replenish the unallocated memory in the computer system to at least the threshold amount.

15. The system of claim 11 where the reclamation policy is based on at least one of an amount of stationary and discretionary memory requested by each process, an amount of stationary and discretionary memory allocated to each process, an amount of stationary and discretionary memory allocated to each process in excess of an amount of stationary and discretionary memory requested by each process, an inertia value associated with each process, and an amount of unallocated memory in the computer system.

16. The system of claim 11 wherein requesting reclamation includes:
  sending, to a process to which discretionary memory has been allocated, a reclamation request; and
  in response to receiving the reclamation request, releasing, by the process, at least a portion of the discretionary memory that has been allocated to the process the process.

17. The system of claim 16 wherein sending a reclamation request comprises invoking a reclamation callback function in the process from which reclamation is being requested.

18. The system of claim 11 wherein the memory broker function is adapted to:
  (a) receive, from one of the plurality of processes, a request for notification of the availability of a specified amount of discretionary memory; and
  (b) in response to receiving the notification request, register the one process to receive notification of the availability of the specified amount of discretionary memory.

19. The system of claim 18 wherein the memory broker function is adapted to:
  determine that the specified amount of discretionary memory is available; and
  in response to determining that the specified amount of discretionary memory is available, notify the one process of the availability of the specified amount of discretionary memory.

20. The system of claim 19 wherein notifying the one process of the availability of the specified amount of discretionary memory comprises invoking an availability callback function in the one process.

21. A computer program product comprising computer executable instructions embodied in a non-transitory computer readable medium for performing steps comprising:
  at a memory broker function for allocating memory in a computer system among a plurality of processes executing on the computer system and separate from the memory broker function, wherein the memory in the computer system includes stationary memory, discretionary memory, and unallocated memory:
    monitoring amounts of stationary memory, discretionary memory, and unallocated memory in the computer system;
    receiving a request for allocating discretionary memory to one of the processes;
    in response to receiving the request, determining, using an allocation policy, whether to allocate discretionary memory to the one process;
    in response to determining to allocate the discretionary memory to the one process, allocating the discretionary memory to the one process;
    determining, based on a reclamation policy, that at least a portion of discretionary memory allocated to at least one of the processes should be reclaimed; and
    in response to determining that at least a portion of discretionary memory should be reclaimed, requesting reclamation of at least a portion of discretionary memory from at least one of the plurality of processes,
  wherein the stationary memory is allocated memory of the memory in the computer system that is required by a process and that is not subject to reclamation by the memory broker function unless the allocated memory has been discarded by the process to which the memory is allocated and wherein the discretionary memory is allocated memory of the memory in the computer system that is subject to reclamation by the memory broker even if the allocated memory has not been discarded by the process to which the memory is allocated, and wherein the reclamation policy considers process inertia values that indicate how resistant a process is to changing its memory usage.

* * * * *